United States Patent [19]

Cok

[11] Patent Number: 5,097,335
[45] Date of Patent: Mar. 17, 1992

[54] MECHANISM FOR ELIMINATING COLORED SHADOW/HIGHLIGHT ERRORS IN SCANNED COLOR IMAGE

[75] Inventor: David R. Cok, Rochester, N.Y.

[73] Assignee: Eastman Kodak Company, Rochester, N.Y.

[21] Appl. No.: 415,832

[22] Filed: Oct. 2, 1989

[51] Int. Cl.⁵ .............................................. H04N 5/14
[52] U.S. Cl. ........................................ 358/163; 358/44
[58] Field of Search .................. 358/44, 43, 41, 163, 358/213.15, 213.17

[56] References Cited

U.S. PATENT DOCUMENTS

| | | | |
|---|---|---|---|
| 3,737,561 | 6/1973 | Boer | 178/5.4 R |
| 3,875,583 | 4/1975 | Poetsch et al. | 358/27 |
| 3,936,870 | 2/1976 | Nakamura | 358/27 |
| 4,025,835 | 7/1977 | Poetsch | 358/29 |
| 4,047,202 | 9/1977 | Poetsch | 358/29 |
| 4,633,299 | 12/1986 | Tanaka | 358/29 |
| 4,680,624 | 7/1987 | Murakami | 358/44 |
| 4,733,295 | 3/1988 | Hemsky et al. | 358/22 |
| 4,745,461 | 5/1988 | Shirai et al. | 358/21 |

Primary Examiner—Howard W. Britton
Assistant Examiner—Kim Yen Vu
Attorney, Agent, or Firm—Edward Dugas

[57] ABSTRACT

Colored shadows (and highlights) in a reproduced color image, caused by limited sensitivities in different channels of an image scanning device, such as a multicolor video camera, are effectively eliminated by controllably adjusting the signal intensity of the output signals of one of the channels in dependance upon whether or not the level of that signal is within a limited region of the camera's response characteristics. As long as the signal level of the channel of interest, (e.g. blue color band channel), lies within a non-limited portion of the sensitivity range of the camera for that channel, the intensity of that channel's output signals are left unchanged. However, in response to the level of the channel's output signals falling within a limited portion of the sensitivity range of the camera, the intensity of that channel's output signals is effectively corrected by substituting in their place the output signals of another camera channel (e.g. the green channel), the dynamic range of which extends beyond that of the limited channel. As a consequence, in the reproduced image, regions, such as shadows and highlights, having intensity levels in the vicinity of one of the extremes of the sensitivity range of the camera, will tend to be neutral and thereby provide a higher quality image.

8 Claims, 3 Drawing Sheets

MECHANISM FOR ELIMINATING COLORED SHADOW/HIGHLIGHT ERRORS IN SCANNED COLOR IMAGE

FIELD OF THE INVENTION

The present invention relates in general to color signal processing and is particularly directed to a mechanism for effectively eliminating colored shadow/highlight errors in a reproduced color image caused by the limited sensitivity range of a color image scanning device.

BACKGROUND OF THE INVENTION

When an image is scanned by a multi-channel (e.g. three color band) transducer, such as an RGB video camera, differences in sensitivity and dynamic range of its respective channels cause the camera to produce color representative output signals which are offset from one another in terms of color intensity and which may be clipped or limited near the upper and lower ends of the overall dynamic range of the camera. An example of these differential sensitivity output characteristics is illustrated in FIG. 1, which shows the relationship between light intensity and output response (color representative signals) for the blue and green channels of an RGB color video camera. Differences in absolute sensitivity are typically compensated by a bias adjustment of the camera's channel outputs, so that, for a neutral color (e.g. white), the output level for each channel output should be effectively the same, irrespective of image intensity. However, as noted above, because the dynamic range of each channel is usually not the same, after applying a signal bias adjustment for aligning, or correcting, the channel output characteristics, there is the problem of limited, or clipped, signal levels in the neighborhood of the extreme ends of the operational range, as shown in FIG. 2.

Namely, in the vicinity of the lower intensity (shadow) end of the camera's sensitivity characteristic, blue signals are clipped at an output intensity level 22, before, or higher than, green signals, which are clipped at a lower output intensity level 32, so that the dynamic range of the green response characteristic extends over a region 33 that falls below the blue intensity level 22. As a consequence, when the scanned image is reconstructed, for example, by way of a RGB color print machine, regions of low intensity (shadows) are blue-colored, rather than neutral, thereby degrading the quality of the reproduced image. Similarly, at the upper, highlight end of the camera's operational range, because the green response characteristic is clipped at an intensity level 34, above which the blue characteristic varies over region 23 to an upper limit at level 24, the blue signal predominates, thus causing highlights to be blue-tinged.

SUMMARY OF THE INVENTION

In accordance with the present invention, the problem of colored shadows (and highlights) in a reproduced color image, caused by limited sensitivities in different channels of an image scanning device, such as a multicolor video camera, is obviated by a mechanism which controllably adjusts the signal intensity of the output signals of one of the channels in dependance upon whether or not the level of that signal is within a limited region of the camera's response characteristic. Specifically, as long as the signal level of the channel of interest, (e.g. blue color band channel), lies within a non-limited portion of the sensitivity range of the camera for that channel, the intensity of that channel's output signals are left unchanged. However, in response to the level of the channel's output signals falling within a limited portion of the sensitivity range of the camera, the intensity of that channel's output signals is effectively corrected by substituting in their place the output signals of another camera channel (e.g. the green channel), the dynamic range of which extends beyond that of the limited channel. As a consequence, in the reproduced image, regions, such as shadows and highlights, having intensity levels in the vicinity of one of the extremes of the sensitivity range of the camera, will tend to be neutral and thereby provide a higher quality image.

DETAILED DESCRIPTION

Figure 1:
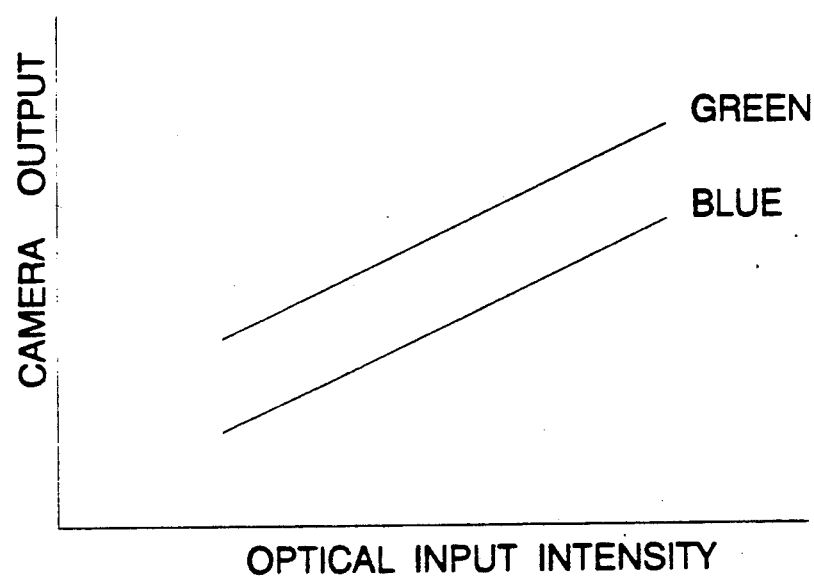
FIGS. 1 and 2 shows relationships between light intensity and output response (color representative signals) for the blue and green channels of an RGB color video camera.

Before describing the details of an embodiment of the present invention, it should be observed that the invention resides primarily in a novel color correction mechanism, rather than a particular implementation of that mechanism. The inventive scheme may be implemented by means of a variety of structural combinations of conventional signal processing circuits and components. Accordingly, the structure, control and arrangement of these conventional circuits and components in accordance with an embodiment of the invention have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustration of FIG. 3 does not necessarily represent the mechanical structural arrangement of the exemplary system, but is primarily intended to illustrate the major structural components of the system in a convenient functional grouping, whereby the present invention may be more readily understood.

Figure 2:
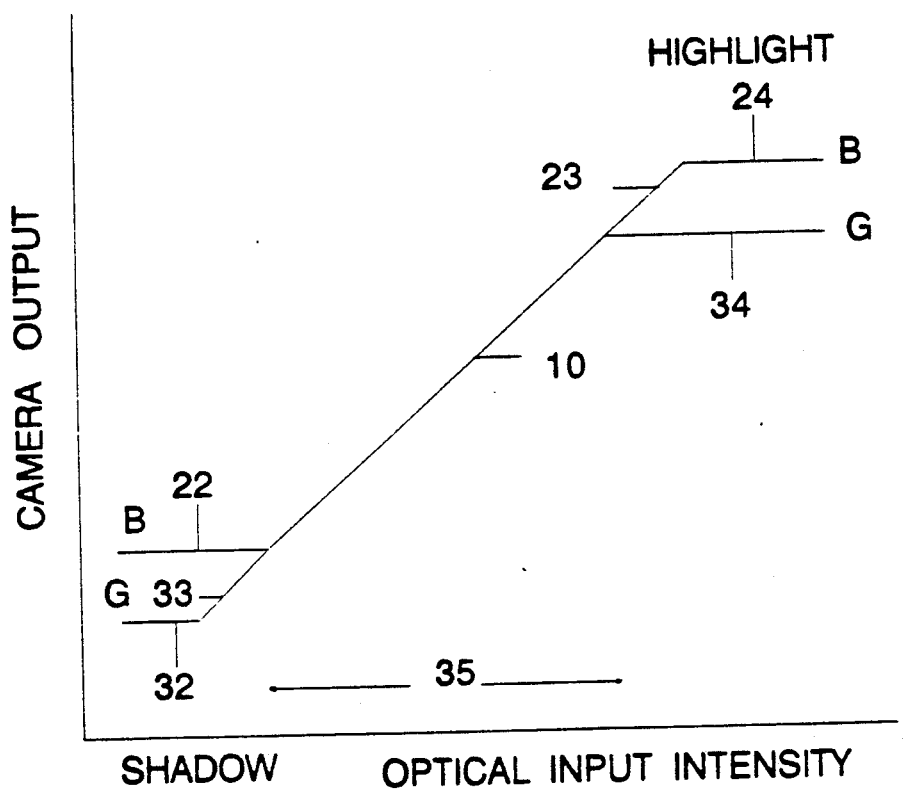
Figure 3:
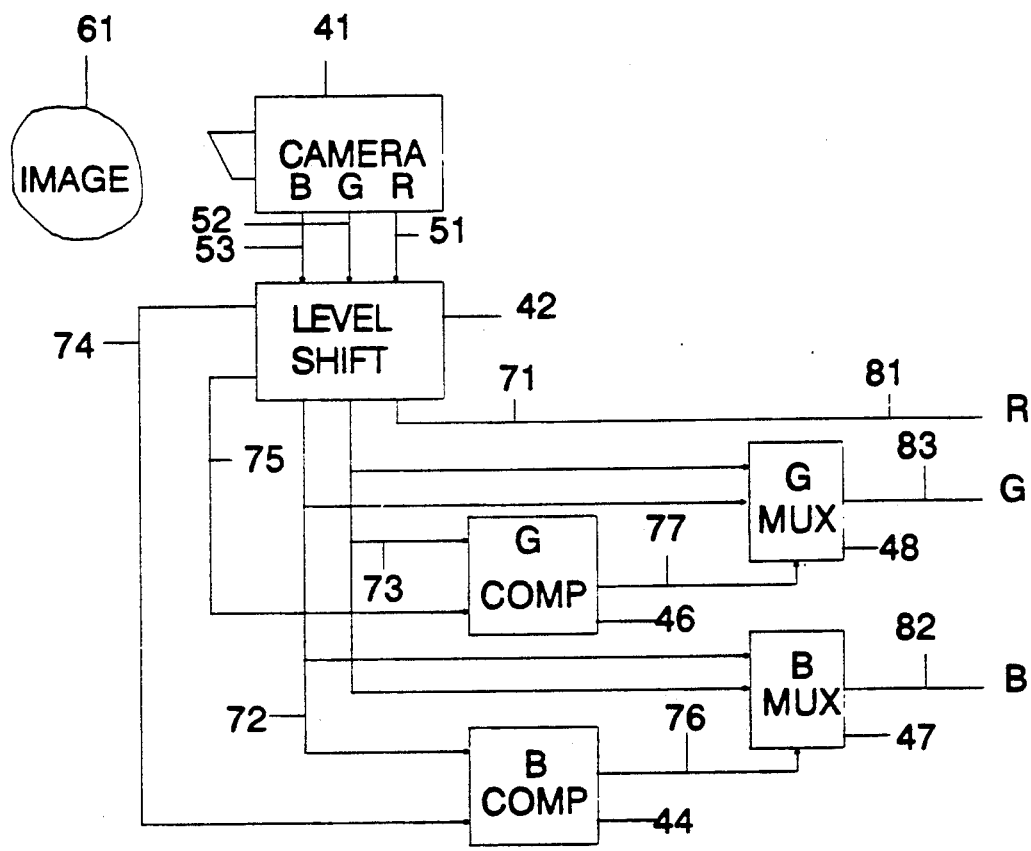
FIG. 3 diagrammatically illustrates a signal coupling network for controllably adjusting the signal intensity of the output signals of one of the channels of an RGB camera in dependance upon whether the signal level is within a limited region of the camera's response characteristic.

Referring now to FIG. 3, a color image processing system is diagrammatically shown as comprising a color image transducer device, such as a digital RGB video camera 41, that supplies over output links 51, 52 and 53 respective red, green and blue channel signal values representative of the red, green and blue color band components of a color image 61, light from which is incident upon an opto-electronic conversion matrix within the camera. As noted previously, when image 61 is scanned by camera 41, differences in sensitivity and dynamic range of its respective (red, green and blue) channels cause output signals on links 51, 52 and 53 to be mutually offset from one another in terms of color intensity. By means of a level shift/bias adjustment (shown by unit 42 and customarily part of the A-D conversion circuitry within the camera proper), the intensities of the camera's output channels for the major region of the response characteristic are effectively mutually aligned, as shown by region 10 in FIG. 2. However, as noted previously, because the dynamic range of each channel is usually not the same, after applying a signal bias adjustment for aligning the channel output characteristics, there is the problem of limited, or clipped, signal levels in the neighborhood of the extreme ends of the operational range, as shown by the differences in the blue and green channels in the composite characteristic of FIG. 2.

Pursuant to the color correction mechanism of the invention, an output channel whose color band is predominant at an extreme region of the camera's response characteristic, such as the clipped blue color band at the lower end of the characteristic shown in FIG. 2, is controllably corrected, so that shadows (and highlights at the upper region of the response characteristic) in a reproduced image will tend to be neutral and thereby of a higher picture quality. In the present description, the characteristics of the red channel will be ignored for purposes of simplification.

In the system shown in FIG. 3, the correction mechanism is implemented by coupling a 'dominating' channel, (e.g. blue), on link 72 from level shifter 42, to a first input of a 'blue level' comparator 44 and another 'neutralizing or color complementing' channel (e.g. green), on link 73 to a first input of a 'green level' comparator 46. A second input of 'blue level' comparator 44 is coupled over link 74 to receive from level shifter 42 a value representative of the magnitude of the blue lower limit 22 (FIG. 2), which corresponds to the sum of the magnitude of the (green) lower limit 32 of the composite characteristic 10 and the differential between the blue and green lower limits 22 and 32, respectively. Similarly, a second input of 'green level' comparator 46 is coupled over link 75 to receive from level shifter 42 a value representative of the magnitude of the green upper limit, or ceiling, 34 (FIG. 2), corresponding to the difference between the magnitude of the (blue) upper limit, or ceiling, 24 of the composite characteristic 10 and the differential between the blue and green upper limits 24 and 34, respectively. The outputs of comparators 44 and 46 are coupled over respective links 76 and 77 to the select inputs of a pair of multiplexers 47 and 48, inputs of each of which are coupled to the blue and green channel links 72 and 73, respectively. The output of multiplexer 47 is coupled to a blue channel output link 82, while the output of multiplexer 48 is coupled to a green channel output link 83. The red channel output link 81 is coupled directly to link 71 from level shifter.

In operation, as camera output signals, whose intensities are adjusted by level shifter 42 to obtain an aligned response characteristic, such as that shown in FIG. 2, are coupled over links 71, 72 and 73, comparators 44 and 46 monitor the levels of the blue and green band-representative signals on links 72 and 73, respectively. Considering the blue channel, for example, as long as its signal level lies within a non-limited portion of the sensitivity range of the camera for that channel, namely, within region 35 of FIG. 2, comparator 44 causes multiplexer 47 to select the blue channel, so that the blue channel's output signals are coupled to blue channel output link 82, whereby the intensity of the blue channel signals are left unchanged. However, in response to the level of the blue channel's output signals falling within a limited portion of the sensitivity range of the camera, for example below the blue lower limit 22 of FIG. 2, the output of comparator 44 will change state, thereby causing multiplexer 47 to couple the green channel's output signal over blue channel output link 82. Namely, the intensity of the blue channel output signal is effectively corrected by substituting in its place the output signal of another channel (e.g. the green channel), the dynamic range of which extends beyond that (e.g. below blue lower limit 22) of the limited channel. As a consequence, in the reproduced image, shadows will tend to be neutral and thereby provide a higher quality image.

Similarly, for green channel 73, as long as its signal level lies within region 35 of the sensitivity range of the camera for that channel, comparator 46 causes multiplexer 48 to select the green channel, so that the green channel's output signals are coupled to green channel output link 83, whereby the intensity of the green channel signals are left unchanged. However, in response to the level of the green channel's output signals reaching the upper limited portion of the sensitivity range of the camera (above green upper limit 34 of FIG. 2), the output of comparator 46 will change state, thereby causing multiplexer 48 to couple the blue channel's output signal over green channel output link 83. Namely, in the case of a highlight, the intensity of the green channel output signal is effectively corrected by substituting in its place the output signal of the blue channel, whose dynamic range extends beyond that (e.g. above upper green limit 34) of the limited channel. As a consequence, in the reproduced image, highlights will also tend to be neutral, again improving the quality of the image.

It should be observed that, while in the foregoing description, an embodiment of the invention has been presented in terms of blue and green channels of a color video camera, the invention is not limited to these specific color bands or to use with the a particular imaging device. Regardless of the type of imaging device employed and the color band outputs it generates, what is important is the use of the extended dynamic range of another output channel to replace the signal intensity of a clipped color channel, so that the combined effect of the two channels in the reproduction of the scanned image will yield neutral shadows and highlights.

As will be appreciated from the foregoing description, the present invention solves the problem of colored shadows (and highlights) in a reproduced color image resulting from the limited sensitivities of different channels of an image scanning device, such as a multicolor video camera, by controllably adjusting the intensity of the output signals of one of the channels in dependance upon whether or not the level of that signal is within a limited region of the camera's response characteristic. As a consequence, in the reproduced image, regions, such as shadows and highlights, having intensity levels in the vicinity of one of the extremes of the sensitivity range of the camera, will tend to be neutral and thereby provide a higher quality image.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a color opto-electronic transducer that produces respective output signals representative of the color contents of an input image, for respectively different color bands, a method of controlling the contents of said signals so as to compensate for color-level limiting action of said transducer comprising the steps of:
   (a) monitoring the output of said transducer for a color band representative signal the color level response characteristic of which is limited to a range less than the operational range of said transducer; and
   (b) generating a first output signal corresponding to the monitored output of said transducer for a color band representative signal in response to the color level thereof being within the operational range, and otherwise generating a second output signal corresponding to the monitored output of said transducer for a second color band.

2. For use with a multicolor sensitive video camera that produces a plurality of output signals, each of which is associated with a respective color band within the color sensitivity range of said camera, a method of controlling the contents of one of said output signals associated with a first color band, the camera's sensitivity for which is limited to less than its multicolor operational range, comprising the steps of:
   (a) monitoring the level of said one output signal;
   (b) in response to the level of said one output signal lying within the non-limited portion of the sensitivity range of said camera for said first color band, generating a first color band representative output signal in accordance with said one output signal; and
   (c) in response to the level of said one output signal lying within a limited portion of the sensitivity range of said camera for said first color band, generating said first color band representative signal in accordance with another of said plurality of output signals, associated with a second color band, the level of which lies within a non-limited portion of the sensitivity range of said camera for said second color band.

3. For use with an RGB color video camera that produces respective signals representative of the color content of red, green and blue bands within an image scanned by the camera, the color sensitivity of said camera differing for said red, green and blue bands and being such that a first signal representative of a relatively low color intensity for one of red, green and blue band regions of an image is limited at a first signal intensity greater than that of a second signal representative of an other of said red, green and blue band regions of an image, a method of controlling the signal intensity of signals representative of said one band regions of the first signal comprising the steps of:
   (a) monitoring the level of said first signal;
   (b) in response to the level of said first signal corresponding to said first limited signal intensity, generating a first output signal representative of said one band regions in accordance with the signal intensity of said second signal; and
   (c) in response to the level of said first signal being greater than said first limited signal intensity, generating said first output signal in accordance with the signal intensity of said first signal.

4. A method according to claim 3, wherein said second signal is limited at a second signal level intensity less than that of said first signal for regions of relatively high color intensity, and further including the steps of:
   (d) monitoring the level of said second signal,
   (e) in response to the level of said second signal corresponding to said second limited signal intensity, generating a second output signal representative of said another band regions in accordance with the signal intensity of said first signal; and
   (f) in response to the level of said second signal being less than said second limited signal intensity, generating said second output signal in accordance with the signal intensity of said second signal.

5. A method according to claim 3, wherein said first signal is representative of the color contents of blue band regions of said image and said second signal is representative of the color contents of green band regions of said image.

6. For use with an RGB color video camera that produces respective signals representative of the color content of red, green and blue bands within an image scanned by the camera, the color sensitivity of said camera differing for said red, green and blue bands and being such that a first signal representative of a relatively low color intensity for one of red, green and blue band regions of an image is limited at a first signal intensity greater than that of a second signal representative of another of said red, green and blue band regions of an image, an apparatus for controlling the signal intensity of signals representative of said one band regions of the first signal comprising:
   first means for monitoring the level of said first signal; and
   second means, coupled to said first means and responsive to the level of said first signal corresponding to said first limited signal intensity, for generating a first output signal representative of said one band regions in accordance with the signal intensity of said second signal, but otherwise, in response to the level of said first signal being greater than said first limited signal intensity, generating said first output signal in accordance with the signal intensity of said first signal.

7. An apparatus according to claim 6, wherein said second signal is limited at a second signal level intensity less than that of said first signal for regions of relatively high color intensity, and further including third means, coupled to said first means, for monitoring the level of said second signal and, in response to the level of said second signal corresponding to said second limited signal intensity, generating a second output signal representative of said another band regions in accordance with the signal intensity of said first signal, but otherwise, in response to the level of said second signal being less that said second limited signal intensity, generating said second output signal in accordance with the signal intensity of said second signal.

8. An apparatus according to claim 6, wherein said first signal is representative of the color contents of blue band regions of said image and said second signal is representative of the color contents of green band regions of said image.

* * * * *